United States Patent
Davron et al.

(10) Patent No.: US 12,386,926 B2
(45) Date of Patent: Aug. 12, 2025

(54) PROCESS AND PLATFORM FOR TRACEABILITY OF AN ATTACHMENT GENERATED BY A THIRD PARTY FROM A SOURCE DOCUMENT BY MEANS OF A BLOCKCHAIN SYSTEM

(71) Applicant: DAVRON DIGITAL, Paris (FR)

(72) Inventors: Anne-Cecile Davron, Paris (FR); David Davron, Paris (FR)

(73) Assignee: DAVRON DIGITAL, Paris (FR)

( * ) Notice: Subject to any disclaimer, the term of this patent is extended or adjusted under 35 U.S.C. 154(b) by 237 days.

(21) Appl. No.: 18/028,481

(22) PCT Filed: Sep. 22, 2021

(86) PCT No.: PCT/EP2021/076095
§ 371 (c)(1),
(2) Date: Mar. 24, 2023

(87) PCT Pub. No.: WO2022/063844
PCT Pub. Date: Mar. 31, 2022

(65) Prior Publication Data
US 2024/0061912 A1 Feb. 22, 2024

(30) Foreign Application Priority Data
Sep. 24, 2020 (FR) ...................................... 2009747

(51) Int. Cl.
*G06F 21/16* (2013.01)
*G06F 16/908* (2019.01)

(52) U.S. Cl.
CPC ............ *G06F 21/16* (2013.01); *G06F 16/908* (2019.01)

(58) Field of Classification Search
CPC .. G06F 21/62; G06F 21/6209; G06F 21/6218; G06F 21/6227; G06F 21/64;
(Continued)

(56) References Cited

U.S. PATENT DOCUMENTS 11,537,592 B1 * 12/2022 Krishnan ............ G06F 16/2365
2019/0356493 A1 11/2019 Fisher et al.
(Continued)

FOREIGN PATENT DOCUMENTS

WO 2020123464 A1 6/2020

OTHER PUBLICATIONS

English translation of International Search Report from corresponding PCT Appln. No. PCT/EP2021/076095, dated Dec. 14, 2021. 3 pages.
(Continued)

*Primary Examiner* — Malcolm Cribbs
(74) *Attorney, Agent, or Firm* — GREENBLUM & BERNSTEIN, P.L.C.

(57) ABSTRACT

The invention relates to the traceability of an attachment (DA) generated by a third party (100) from a source document (D1). An initialisation step (S0) consists of saving and analysing the source document (D1) to obtain initialisation metadata placed in a smart contract (B1) of a blockchain system (B). A processing step (S1) performed by the third party (100) consists of generating the attachment (DA), this and the source document (D2) being signed electronically by the third party (100). A receiving step (S2) consists of saving and analysing the signed source document (D2) and the signed attachment (DA) to obtain receiving metadata, placed in the smart contract (B1). A smart contract (B1) is placed after each initialisation step (S0) and each receiving step (S2), thus enabling the creation of an audit/traceability trail for the attachment (DA) generated by the third party (100) from the source document (D1).

10 Claims, 8 Drawing Sheets

Figure 1:
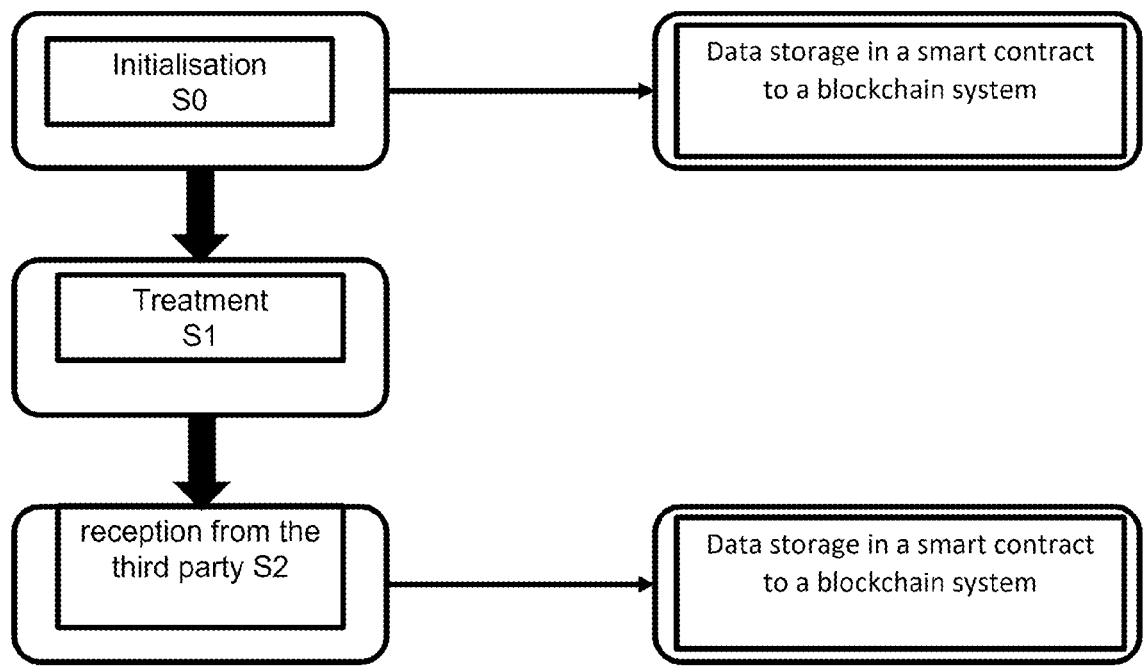

(58) Field of Classification Search
CPC .... G06F 16/1824; G06F 21/44; G06F 21/629; G06F 16/2379; G06F 16/9027; G06F 16/908; G06F 21/16; H04L 9/0643; H04L 9/30; H04L 2209/38; H04L 9/0637; H04L 9/0618; H04L 9/3247; H04L 9/3239; H04L 9/3263; H04L 2209/56; H04L 9/0656; G06Q 20/06; G06Q 20/382; G06Q 20/401; G06Q 2220/00; G06Q 20/381; G06Q 40/04; G06Q 20/3825; G06Q 20/3827; G06K 9/00577; G06K 2009/00583
See application file for complete search history.

(56) References Cited

U.S. PATENT DOCUMENTS

2020/0162236 A1    5/2020   Miller et al.
2021/0135843 A1*   5/2021   Dash ................... H04L 9/3236
2023/0351374 A1*  11/2023   Huang ............... G06Q 20/3829

OTHER PUBLICATIONS

Nizamuddin, et al., "Decentralized Document Version Control using Ethereum Blockchain and IPFS", Computers & Electrical Engineering • Mar. 2019.

* cited by examiner

PROCESS AND PLATFORM FOR TRACEABILITY OF AN ATTACHMENT GENERATED BY A THIRD PARTY FROM A SOURCE DOCUMENT BY MEANS OF A BLOCKCHAIN SYSTEM

CROSS REFERENCE TO RELATED APPLICATIONS

This application is a US National Stage Application of PCT/EP2021/076095, filed 22 Sep. 2021, and claims priority to French Foreign Patent Application 2009747 filed 24 Sep. 2020, both of which are incorporated herein by reference in their entirety.

This invention relates to the traceability of an attachment generated by a third party from a source document by means of a blockchain system.

It has a general application in establishing a traceability procedure with evidentiary value for a document to be processed by several third parties, and more particularly in legalisation or apostille procedures of competent authorities requiring verification of the authenticity of the documents submitted.

The term "document processing" refers herein to any computer processing of a digital document including, but not limited to, translation, legalisation, apostille, association of an attachment, or other comparable processing operation.

In general terms, the legalisation/apostille procedure requires a digital document to undergo several validation steps performed by several (third) parties of various types, such as companies, associations, notaries, chambers of commerce, foreign ministries, consulates, town halls, sworn translators, and others.

Electronic signatures are often made independently of one another. The third parties signing the documents are not necessarily aware of the previous or the subsequent processing steps and do not, as a rule, consult one another.

In addition, certain processing operations are performed physically on a document, and said document is scanned and added by the processing party. This adds to the difficulty in authenticating a document of digital origin.

The more people involved, the more difficult it becomes, if not impossible, to trace the life of the document in its entirety, and to verify the correct execution of each processing step.

The difficulty of traceability is exacerbated when attachments have to be bound to the document initially being tracked, such as a translation or similar attached file associated with a source document.

The difficulty of traceability is further complicated by the variety of technical standards applied to electronic signing and by the plethora of software solution providers which, for the most part, are not mutually compatible.

Where several parties have to sign the same document, the use of different electronic signature solutions may cause problems of compatibility between electronic signature applications, such as the previous signature(s) being overwritten in the event of signature by a different application, signature at a later time, or signature by a third party to the contract.

In addition, sequential electronic signature by different parties presents operational difficulties, such as locally installing an electronic signature application, downloading the document, signing it locally, and exporting the signed document.

There are known existing processes which allow active verification of the authenticity of a saved document through analysis of the document and generation of a secure access associated with a transaction stored on a blockchain system.

These processes of prior art, however, do not allow for traceability of the authenticity of the source document once it has undergone successive processing operations performed by several distinct third parties, or for a check or a means of providing proof where attachments such as translations or apostilles are added to the source documents by the third party.

This invention addresses these drawbacks.

It relates to a process for traceability of an attachment generated by a third party from a source document by means of a blockchain system.

According to a general definition of the invention, the traceability process comprises the following steps:

Initialisation: Saving and analysis of the source document to obtain initialisation metadata comprising metadata intrinsic to the source document and extrinsic metadata comprising digital fingerprints of the source document, its content, and metadata relating to the source document. The initialisation metadata are placed in a smart contract of the blockchain system;

Processing by the third party: The third party generates the attachment and electronically signs both the attachment generated and the source document it received for processing, indicating the reference digital fingerprints of the reference document to which it is attached and of its content taken to be signed;

Receiving from the third party: Saving and analysis of the signed source document and the signed attachment received from the third party to obtain receiving data comprising intrinsic metadata of the source document and digital fingerprints of the source document received, the attachment, the reference document and their respective content, as well as metadata relating to the source document and the attachment. The receiving metadata are placed in a different smart contract of the blockchain system;

A smart contract thus placed after each initialisation step and each receiving step, thus enabling the creation of an audit and traceability trail for the attachment generated by the third party from the source document.

Thanks to this invention, the audit trail thus created, consolidated, time stamped and signed on a blockchain system, such as a public blockchain system, can be accessed by the competent authorities for purposes of verification and proof of authenticity of the attachment generated by a third party from the source document, and of the status of the source document at any stage of the procedure (initialisation, processing, and receiving).

In one form of embodiment, the process also comprises a step in which the source document is sent to the third party and metadata intrinsic to the source document and extrinsic metadata containing the digital fingerprints of the source document, its content, and metadata relating to the source document are placed in a smart contract of the blockchain system.

In an advantageous form of embodiment, the metadata thus obtained at each initialisation, sending and receiving step are stored in a database and subsequently associated in a Merkle tree, the root hash of which is placed in the blockchain system.

For example, the intrinsic metadata belong to the group consisting of type, name, size, save date, user ID.

In practice, the digital fingerprints are calculated according to a chosen hash function, such as SHA 256.

In another form of embodiment, the attachment belongs to the group consisting of translated document, digital document containing a legalisation, digital document including an apostille.

The object of the invention is also a platform for traceability of an attachment generated by a third party from a source document associated using an interactive tool by means of a blockchain system, for implementation of the process in accordance with the invention.

In another aspect of the invention, the platform comprises:
- means of saving and analysing the source document to obtain initialisation metadata comprising metadata intrinsic to the source document and extrinsic metadata comprising digital fingerprints of the source document, its content, and metadata relating to the source document,
- means of receiving from the third party consisting of means of saving and analysing the signed source document and the attachment received from the third party to obtain receiving data comprising intrinsic metadata of the source document and digital fingerprints of the source document received, the attachment, the reference document, and their respective content, as well as metadata relating to the source document and the attachment;
- means of placing the initialisation metadata and the receiving metadata in a respective smart contract of the blockchain system.

In another form of embodiment of the invention, the platform comprises an application module capable of recording the document processing parameters desired by a user, identifying at least one necessary processing operation, selecting for each necessary processing operation at least one third party in each necessary database, and assigning the next additional third party once the current third party has processed and saved the document.

The process in accordance with the invention allows for complete tracing of the life of the source document and of any associated documents attached or bound to it which are generated during one or more processing operations, and for evidence of correct execution of each processing step, while allowing the integration of multiple third parties in the processing chain and resolving the problem of disparity in the standards used by each third party.

In an advantageous form of embodiment, the integration of the information targeted by the process in accordance with the invention on a smart contract placed on a blockchain system also allows for immobilisation of the information deposited concerning the metadata of the documents and their digital fingerprints at any stage of the processing cycle, thus guaranteeing the consolidation of the information forming the audit trail for the entities verifying the authenticity of the documents.

Figure 2:
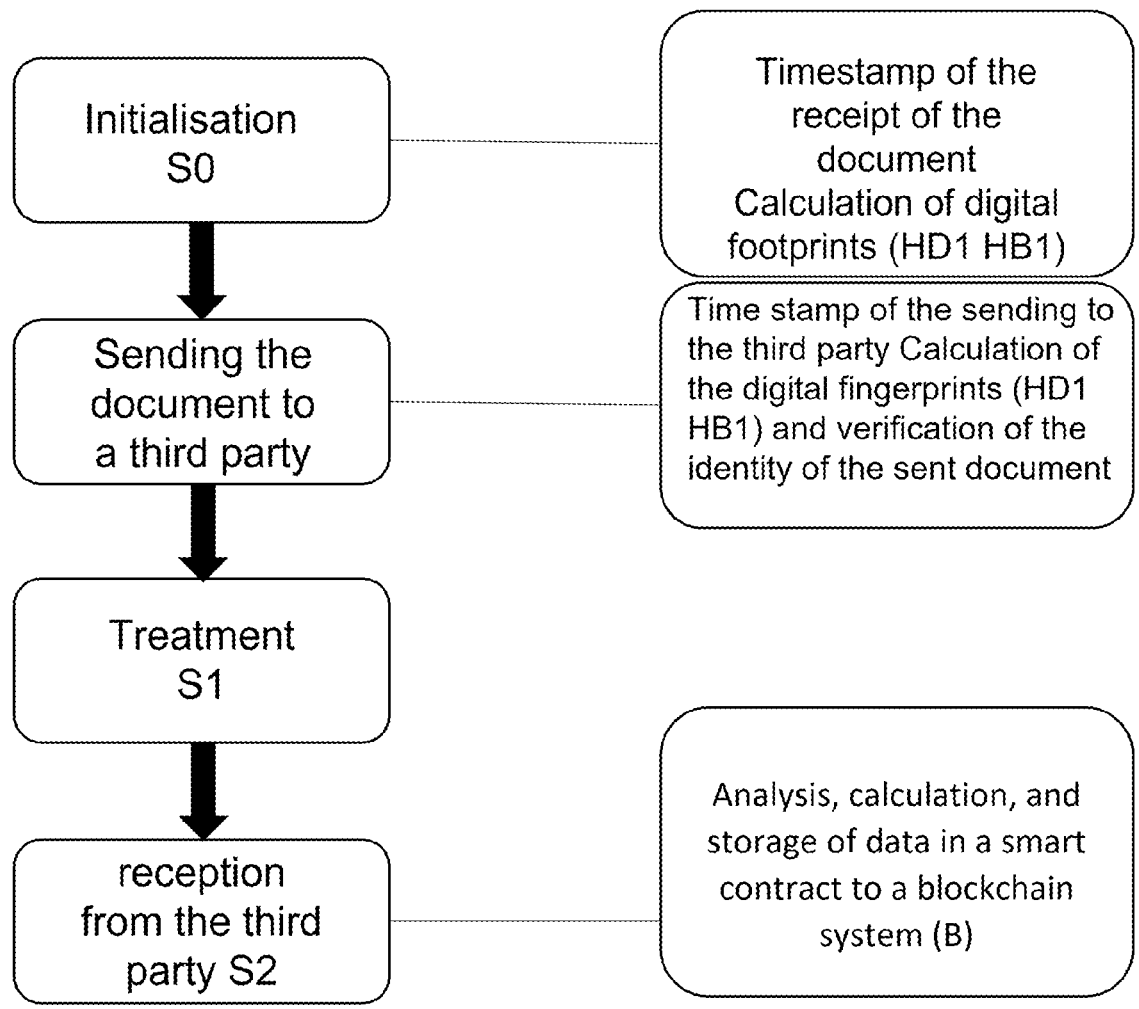
Figure 3:
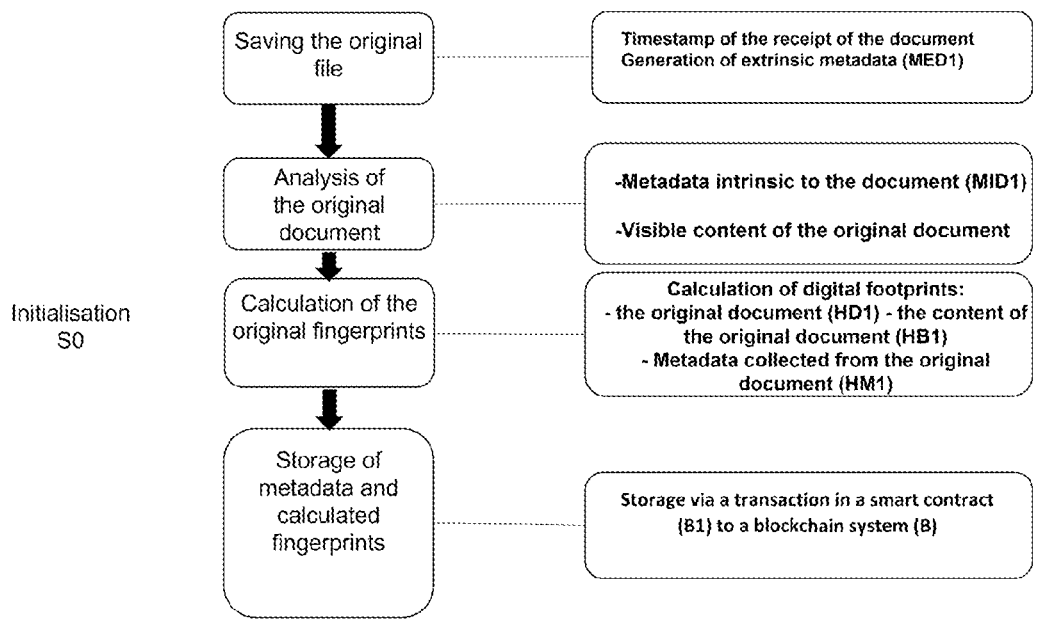
Figure 4:
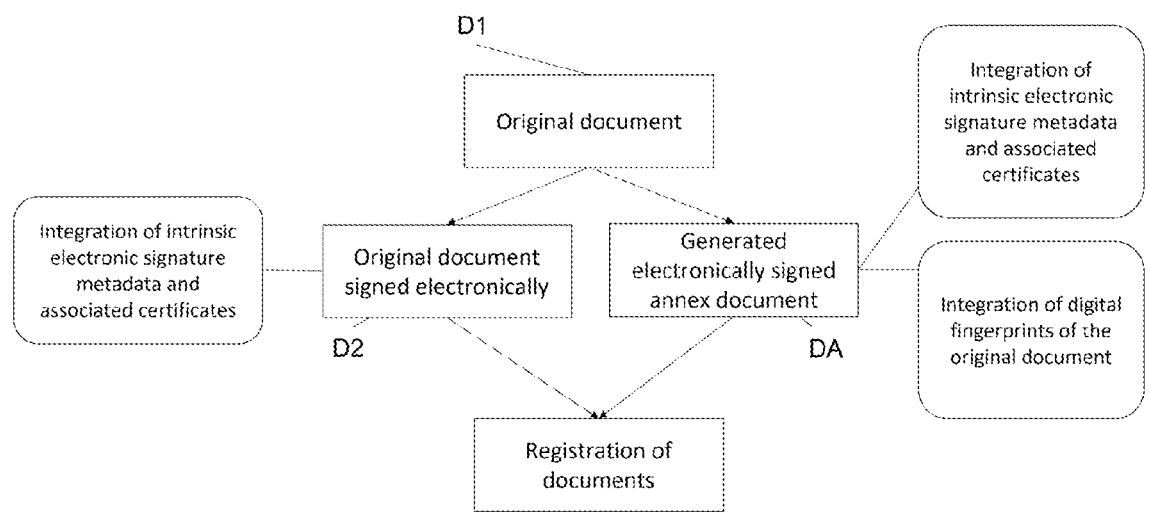
Figure 5:
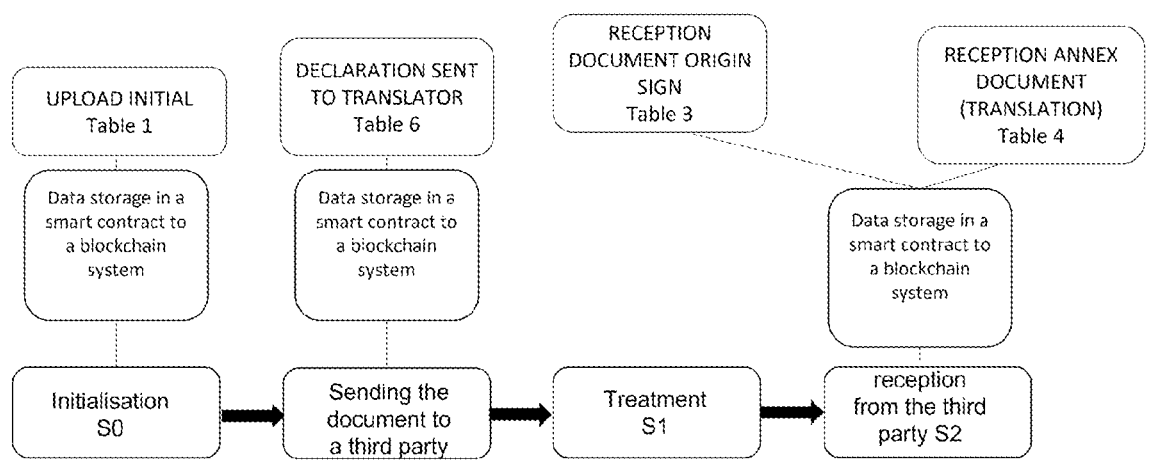
Figure 6:
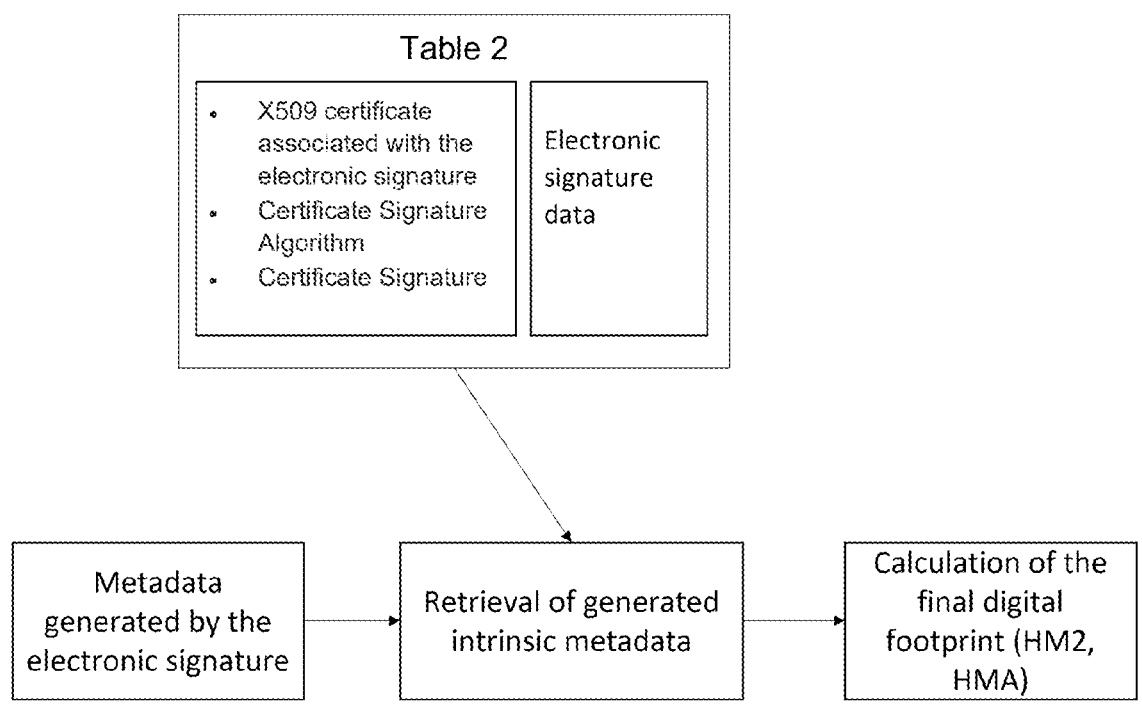
Figure 7:
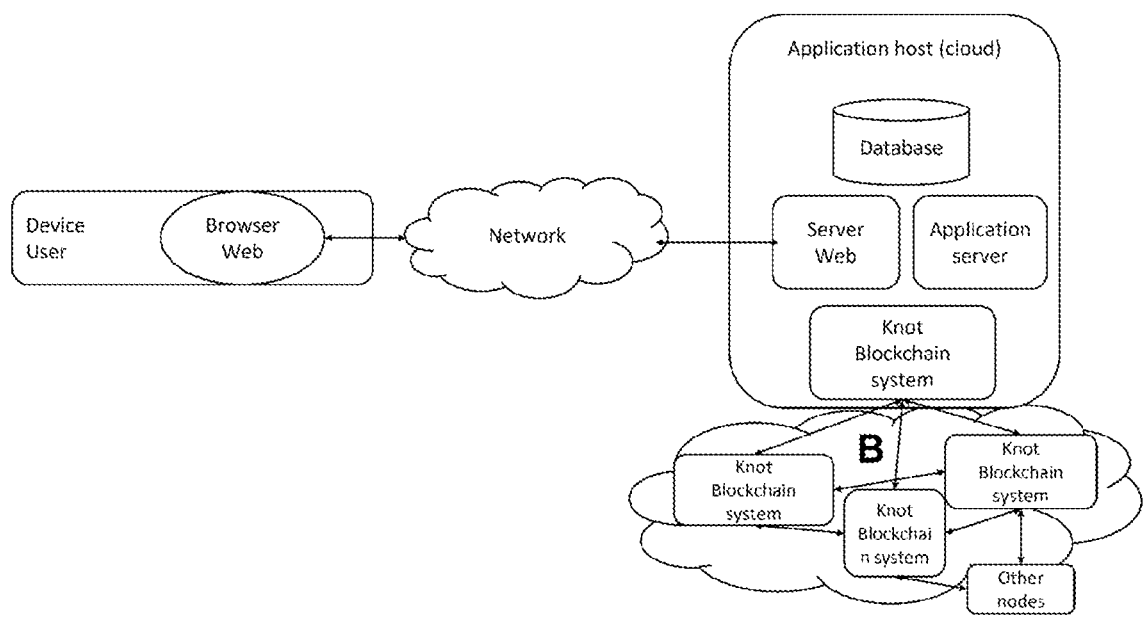
Figure 8:
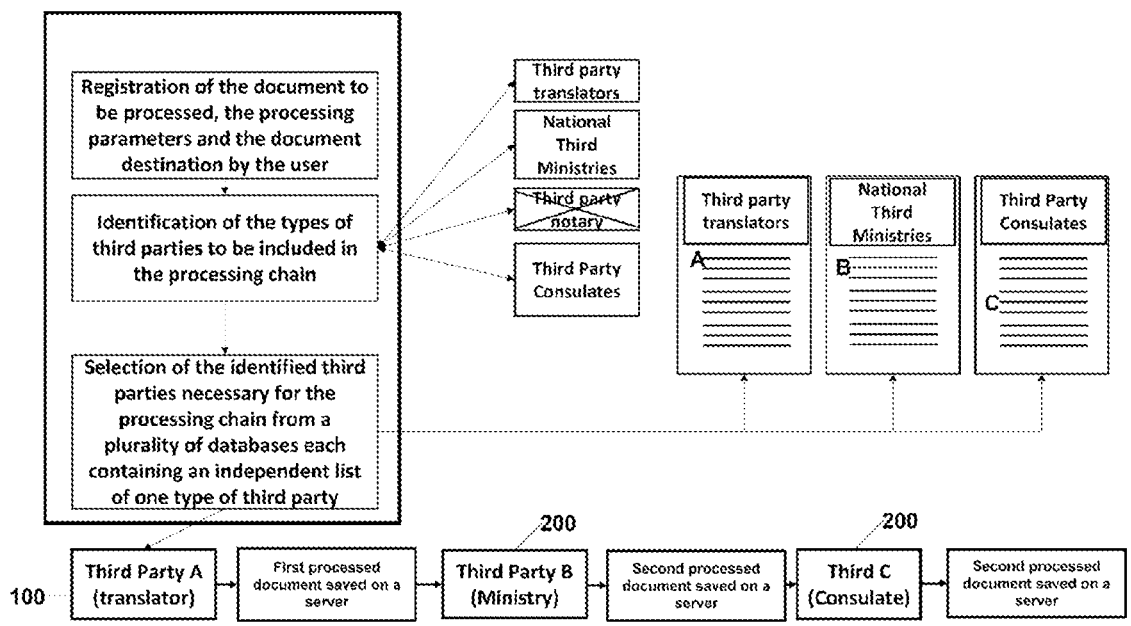

Other characteristics and advantages of the invention will become apparent from the following detailed description and from the drawings and tables, where:

FIG. 1 schematically describes the steps of the traceability process in accordance with the invention;

FIG. 2 schematically describes a particular form of embodiment of the traceability process in accordance with the invention;

FIG. 3 schematically describes the sub-steps of the initialisation step in accordance with the invention;

FIG. 4 schematically represents a particular example of the processing step in accordance with the invention;

FIG. 5 schematically describes a form of embodiment of the data stored in the storage sub-steps on a block system of the process in accordance with the invention;

FIG. 6 schematically describes a particular form of embodiment of the intrinsic metadata retrieved in the course of implementing the process in accordance with the invention;

FIG. 7 schematically describes the hardware architecture of the platform in accordance with the invention; and FIG. 8 schematically describes the functions of the application module of the platform in accordance with the invention.

With reference to FIGS. 1 to 5, the traceability process in accordance with the invention comprises a series of steps in the following sequence: an initialisation step S0 aimed at analysing, calculating and saving the information of a source document D1 in a transaction on a blockchain system B to establish a first link of a traceability chain; a processing step S1, performed by a third party 100, integrating the generation of an electronically signed source document and an attachment DA associated with the signed source document D2; and a receiving step S2 from the third party 100 consisting of saving and analysing the documents D2, DA generated in the course of the processing S1, and the calculation of corresponding electronic fingerprints to be stored in a blockchain system B.

In a first initialisation step S0, a user saves a digital source document D1. The digital source document D1 is then analysed to obtain data relating to its visible content, as well as initialisation metadata.

In practice, the visible content data belong, but are not limited, to the group consisting of text, image, digital object integrated into the document D1, or similar data.

In one form of embodiment of the invention, the sub-step consisting of analysis of the source document D1 comprises a text recognition operation enabling the extraction in text form of any textual content recognised in the document.

As a nonlimitative example, the text recognition operation belongs to the group consisting of Voice recognition for audio and video source documents and Visual OCR for image-type documents.

Retrieved from among the metadata obtained are metadata intrinsic to the source document D1 and metadata extrinsic to the source document D1.

The metadata intrinsic to the source document D1 belong to the group consisting of document name, size, electronic signature data, certificate data, project identification, attachment object and procedure number.

As a nonlimitative example, the intrinsic metadata of a document belong to the group consisting of type of document, type of processing, identity of the third party signatory, electronic signature(s) and associated certificate(s), validity of the certificate(s) as at the date of signature, title, author(s), company, date, place, source language, country of issue.

Alternatively, if the document is an attachment associated with a processed document, the intrinsic metadata belong, but are not limited, to the group consisting of type of document, language of destination, country of destination, function of the third party 100, authority under which the third party 100 operates, electronic signature(s) and associated certificates of the third party 100, identity of the third party signatory (or signatories), electronic signature(s) and associated certificates, validity of the certificate(s) as at the date of signature, title, date, place, type of seal or stamp.

The metadata MED1 extrinsic to the source document D1 are defined as the metadata generated by the application implementing the process in accordance with the invention, and comprising, as a minimum, the time stamp of saving by the user, as well as the ID of the user saving said source document D1.

In a sub-step of the initialisation step S0 of the process in accordance with the invention, chosen digital fingerprints are calculated which define metadata extrinsic to the source document D1 to be generated.

In practice, a chosen hash function is applied for the calculation of the digital fingerprints.

As an example, the digital fingerprints are calculated using an SHA 256 hash function.

The calculation sub-step of the initialisation step S0 in accordance with the invention comprises the calculation of the digital fingerprint of the source document HD1, the digital fingerprint HB1 of the content analysed, and the digital fingerprint HM1 of the intrinsic metadata relating to the source document D1.

In a final sub-step of the initialisation step S0, the digital fingerprints thus calculated, HD1, HB1, HM1, as well as the intrinsic metadata extracted and the extrinsic metadata generated, are stored in a transaction by means of a smart contract B1, in a blockchain system B.

TABLE 1

INITIAL UPLOAD

| Type | Original to be legalised |
|---|---|
| Name | KBIS COMPANY PDF |
| Size | 17 KB |
| Upload date | Aug. 9, 2020 at 11:10 |
| IS User upload | ABL |
| HD1 | 3j4XH |
| HB1 | Lolp3 |
| HM1 | X059 |
| Signature data | N/A |
| ID "PROJECT" internal Davron | 7 |

The traceability process in accordance with the invention also comprises a processing step S1 performed by a third party 100.

The third party 100 is understood to mean any party authorised to perform a chosen processing operation.

As a nonlimitative example, the third party 100 may be a notary, a sworn translator, a national or foreign governmental entity, or any other comparable party authorised to certify a document.

Processing is defined as any act of electronic signing of a document allowing certification of that document by a competent third party 100, as well as any other attachments generated.

As a nonlimitative example, the processing belongs to the group consisting of the attachment of an electronic signature to a source document D1 by a sworn third party and the generation of an attachment DA associated with the electronically signed source document D2, the translation and signature of a source document D1 generating a translated attachment DA, and the legalisation of/attachment of an apostille to at least one document D1 to be processed.

In practice, the attachment DA belongs to the group consisting of translated document, digital document containing a legalisation, and digital document including an apostille.

The electronic signature applied to the source document D1 and its attachment DA allows for the integration of metadata intrinsic to the document including the signature data and the associated certificate(s).

TABLE 2

| Certificate X509 associated with the electronic signature | Electronic signature data |
|---|---|
| Version Number | Date and time of signature |
| Serial Number | Transaction ID |
| Signature Algorithm ID | Status |
| Issuer Name | Type of signature |
| Validity period | Signature platform |
| Not Before | |
| Not After | |
| Subject name | |
| Subject Public Key Info | |
| Public Key Algorithm | |
| Subject Public Key | |
| Issuer Unique Identifier (optional) | |
| Subject Unique Identifier (optional) | |
| Extensions (optional) | |
| . . . | |
| Certificate Signature Algorithm | |
| Certificate Signature | |

The processing step S1 in accordance with the invention also comprises the generation of an attachment DA by the third party 100; both the attachment DA thus generated and the source document D1 are electronically signed by the third party 100.

The attachment generated also incorporates the reference fingerprints HRA of the source document D1 with which the attachment is associated, as well as the fingerprint HRBA of the content of the source document D1 taken to be signed with which the attachment DA is associated.

Once the third party 100 has performed the processing, the signed source document D2 and the signed attachment DA thus generated are received in a receiving step S2 via the application implementing the process in accordance with the invention.

In one form of embodiment of the invention, the processing step S1 comprises a sub-step consisting of real-time analysis of the source document D1, the document D2 being processed/modified, and/or the associated attachment DA being generated to obtain, for each document respectively, the intrinsic metadata of the document(s) being processed; and also the extrinsic metadata of the document(s) being processed/generated.

The processing step S1 also comprises a second sub-step consisting of calculation of the digital fingerprints of the document(s) being processed and its/their content according to one or more progress statuses of the processing performed, as well as the digital fingerprints of the intrinsic metadata of the document(s) being processed/generated.

The processing step S1 also comprises a third sub-step consisting of placing in a smart contract (B1) of a blockchain system (B) the intrinsic metadata and the extrinsic metadata extracted, integrating the digital fingerprints calculated, executed according to one or more progress statuses of the processing performed on the document(s) which are the object of the processing step S1.

In an advantageous form of embodiment, placement in a smart contract of the metadata relating to a document being processed at several stages of the processing phase also allows for real-time certification of the status of the document.

The process in accordance with the invention comprises a receiving step S2 from the third party 100 of the documents generated by the processing step S1, and comprising a first sub-step consisting of saving and, in parallel, analysis of the signed source document D2 and of the signed attachment DA thus received, in order to obtain the data relating to the visible content of said documents D2,DA, as well as the associated intrinsic metadata MID2, MIDA and the extrinsic metadata MED2, MEDA.

The saving of the signed source document D2 and the signed attachment DA is time stamped from the time of receiving, and each time stamp is integrated into the extrinsic metadata MED2, MEDA of each document D2, DA.

signed source document D2 are calculated and said fingerprints are integrated into the metadata extrinsic to the signed source document D2.

For the signed attachment DA, the intrinsic metadata MIDA are extracted, including the name, size and associated electronic signature data and certificates, as well as the reference fingerprints HRA of the reference document D2 with which the attachment DA is associated, and the fingerprint HRBA of the content of the source document D2 with which the attachment DA is associated.

In a calculation sub-step of the receiving step S2, the digital fingerprint of the signed attachment HDA, the digital fingerprint of the content of the attachment HBA, as well as the digital fingerprint of the intrinsic metadata collected from the attachment HMA are calculated and said fingerprints are integrated into the metadata extrinsic to the attachment DA.

Once the digital fingerprints of the signed source document D2 and the attachment DA have been calculated, the

TABLE 3

| RECEIPT OF SIGNED SOURCE DOCUMENT | |
|---|---|
| Type | Original to be legalised |
| Name | KBIS COMPANY PDF |
| Size | 17 KB |
| Upload date | Sep. 9, 2020 at 10:50 |
| IS User upload | ABL |
| Declared origin | DAVRON TRANSLATION |
| User ID of declarant | ABL |
| HD2 | 98JI |
| HB2 | Lolp3 |
| HM2 | tDk8 |
| Signature data | Aug. 9, 2020Certificate**DavronDeliveredbyChamberSignDatedutxx . . . etc . . . |
| ID "PROJECT" internal Davron | 7 |

TABLE 4

| RECEIPT OF ATTACHMENT (TRANSLATION) | |
|---|---|
| Type | Attachment |
| Name | KBIS TRANSLATED RUSSIAN |
| Size | 19 KB |
| Upload date | Sep. 9, 2020 at 10:50 |
| IS User upload | ABL |
| Declared origin | DAVRON TRANSLATION |
| Notifying User ID | ABL |
| HDA | 5Hhu |
| HBA | PooT |
| HMA | 56jU |
| HRA | 98JI |
| HRBA | Lolp3 |
| Signature data | Aug. 9, 2020Certificate**DavronDeliveredbyChamberSignDatedutxx . . . Etc . . . |
| ID "PROJECT" internal Davron | 7 |

For the signed source document D2, the intrinsic metadata MID2 are first extracted, including name, size, and associated electronic signature data and certificates.

In a calculation sub-step of the reception step S2, the digital fingerprint of the signed source document HD2, the digital fingerprint HB2 of the content thus analysed, as well as the digital fingerprint HM1 of the metadata intrinsic to the receiving step S2 also comprises a sub-step of storage via a transaction, implemented by a second smart contract B2, in the blockchain system (B). The second smart contract B2 comprises the intrinsic and extrinsic metadata generated from the signed source document D2 and the attachment DA.

TABLE 5

| Time stamp of receipt of document Generation of extrinsic metadata (MEDA) | Saving of the signed source file (D2) and the associated signed attachment (DA) | Time stamp of receipt of document Generation of extrinsic metadata (MED2) |
|---|---|---|
| Attachment (DA) Metadata intrinsic to the document (MIDA) Visible content of the attachment (DA) Calculation of the digital fingerprints: of the attachment (HDA) of the content of the attachment (HBA) of the metadata collected from the attachment (HMA) | Analysis of the documents<br><br>Calculation of the digital fingerprints of the source | Signed source document Metadata intrinsic to the document (MID2) Visible content of the signed source document (D2) Calculation of the digital fingerprints: of the signed source document (HD2) of the content of the signed source document (HB2) of the metadata collected from the signed source document (HM2) |
| Storage of the metadata and the digital fingerprints of the attachment, as well as the fingerprints of the signed source document (D2) and the content of the signed source document (D2) associated with the attachment (DA) | Storage via a transaction in a smart contract (B1) to a blockchain system (B) | Storage of the metadata and the digital fingerprints of the signed source document, as well as the calculated digital fingerprints of the signed source document (D2) |

Table 5 describes schematically the sub-steps of the receiving step in accordance with the invention.

In a particular form of embodiment of the invention, in the receiving step S2, the metadata thus obtained in each initialisation step S0 and each receiving step S2 are stored in a database and subsequently associated in a Merkle tree, the root digital fingerprint of which is stored via a transaction in the blockchain system B.

In a particular form of embodiment of the invention, the storage sub-step of the receiving step of the process in accordance with the invention comprises a sub-step consisting of verifying the identity of the documents to be traced.

The verification sub-step comprises an initial comparison between the digital fingerprint of the content of the source document D1 and the digital fingerprint of the content of the signed source document D2. If the comparison is positive, then the documents are identical.

The verification sub-step also comprises a second comparison between the reference digital fingerprints HRA of the reference document D2 with which the attachment DA is associated and the digital fingerprint of the signed source document D2, as well as a comparison between the digital fingerprint HRBA of the content of the reference document with which the attachment DA is associated and the digital fingerprint of the content of the signed source document D2.

If the comparisons are positive and the digital fingerprints are identical, the submitted attachment DA is confirmed to be associated with the signed source document D2.

The verification sub-step serves to ensure the conformity of the traceability chain, at the same time allowing the authentication of an associative link between a signed document D2 and an attachment DA, thus creating a traceability tree.

In an advantageous form of embodiment, the extraction of the text of the document in each analysis sub-step for documents D1, D2, DA means that only the text present in the document can be detected, such that a handwritten signature on a document, or a stamp, would not be recognised as textual content. In a particular form of embodiment, this enables the preservation of a digital fingerprint of identical content even after certain processing operations such as signing, legalising or apostille. It also allows the introduction of a digitised physical document which is not strictly identical to the source document on account of the digitisation conditions applied.

In a particular form of embodiment of the invention, the traceability process in accordance with the invention comprises an additional sending step after the initialisation step S0 and before the processing step S1.

The sending step consists of sending the source document D1 to the third party 100, the metadata MID1 intrinsic to the source document D1 and the extrinsic metadata MED1 comprising: the digital fingerprints of the source document HD1, its content HB1, and metadata HM1 relating to the source document D1, as well as the time stamp metadata of the action of sending the source document D1 to the third party 100. These are stored via a transaction implemented by a third smart contract B3 in the blockchain system B.

TABLE 6

| DECLARATION OF SENDING TO THE TRANSLATOR | |
|---|---|
| Type | Original to be legalised |
| Name | KBIS COMPANY PDF |
| Size | 17 KB |
| Action | Send to step 1 |
| Destination | DAVRON TRANSLATION |
| Declared send date | Aug. 9, 2020 at 12:20 |
| User ID of declarant | ABL |
| HD1 | 3j4XH |
| HB1 | Lolp3 |
| HM1 | X059 |
| Signature data | N/A |
| ID "PROJECT" internal Davron | 7 |

In one form of embodiment of the invention, the sending step also comprises a verification sub-step before the source document D1 is sent for processing by the third party 100, consisting of verifying the identity of the source document D1 to be sent.

The verification sub-step comprises the calculation of the digital fingerprint of the document HD1 to be sent, the digital fingerprint HB1 of the content of the document to be sent, as well as the digital fingerprint HM1 of the intrinsic metadata relating to the source document D1 to be sent.

The verification sub-step also comprises a step consisting of comparing, firstly, the digital fingerprint of the document HD1 to be sent with the digital fingerprint HD of the source document D1, and, secondly, the digital fingerprint HB1 of the content of the document to be sent with the digital fingerprint of the content HB1 of the source document D1.

If the comparison is positive, the document to be sent to the third party is confirmed to be the source document Dd.

TABLE 7

| Time stamp of receipt of document Generation of extrinsic metadata (MEDA) | Saving of the signed source file (D2) and the associated signed attachment (DA) | Time stamp of receipt of document Generation of extrinsic metadata (MED2) |
|---|---|---|
| Attachment (DA) Metadata intrinsic to the document (MIDA) Visible content of the attachment (DA) Calculation of the digital fingerprints: of the attachment (HDA) of the content of the attachment (HBA) of the metadata collected from the attachment (HMA) | Analysis of the documents  Calculation of the digital fingerprints of the source | Signed source document Metadata intrinsic to the document (MID2) Visible content of the signed source document (D2) Calculation of the digital fingerprints: of the signed source document (HD2) of the signed source document content (HB2) of the metadata collected from the signed source document HM2) |
| Additional checks: HB1 = HB2? If so, they are the same document. HRA = HD1 and HRBA = HB1? If so, the attachment refers to the correct document | | |
| Storage of the metadata and the digital fingerprints of the attachment, as well as the digital fingerprints of the signed source document (D2) and the content of the signed source document (D2) associated with the attachment (DA) | Storage via a transaction in a smart contract (B1) to a blockchain system (B) | Storage of the metadata and the digital fingerprints of the signed source document, as well as the calculated digital fingerprints of the signed source document (D2) |

Table 7 schematically describes a particular form of embodiment of the sub-steps of the receiving step in accordance with the invention.

In one mode of embodiment of the invention, the verification sub-step also comprises a visual conformity check.

The visual conformity check can be implemented by comparing the visible content extracted, for example, between a source document D1 and a signed source document D2, a source document D1 and an attachment corresponding to the apostilled/legalised source document, or any document associated with another document whose content consists of identical elements.

For example, a source document D1 with a seal, stamp, or signature physically applied by a third party 100 after processing, and which is then scanned, can be compared with the associated source document D1 by comparison of the visible contents of the respective documents in order to confirm the identity of both documents, using at least a part of their respective visible contents.

In another form of embodiment of the invention, the traceability process is implemented by several successive third parties (100, 200).

The initialisation step S0, the processing step S1, and the receiving step S2 are repeated by the next third party (200) based on the signed source document (D2) and the signed attachment (DA) generated by the previous third party (100).

In a particular form of embodiment of the invention, the sub-steps consisting of storage in a smart contract (B1, B2, B3) via a transaction in the blockchain system B are all performed on a single smart contract combining the information stored.

In an advantageous form of embodiment, storage in a single smart contract enables the verifying entities in the audit trail to have at their disposal all the information necessary to validate the authentication of the documents on a single support medium on the blockchain system B.

In an alternative form of embodiment of the invention, a user can select the identity of the blockchain system B to be used for the storage sub-steps according to the backup parameters chosen by that user when saving the source document D1.

Placing target metadata in at least one smart contract B1 of the blockchain system B at any stage in the process, in accordance with the invention, also allows certification of the status of a document, or of selected data in this/these document(s), or of the association of the document with an attachment, rendering the information it contains immutable and traceable in the audit trail thus created and enabling consolidation of the audit trail during successive processing cycles of the documents.

The digital footprint of the intrinsic metadata of each document D1, D2, DA also makes it possible to render immutable and to certify, in particular, the metadata concerning the electronic signatures of each third party 100, as well as their associated metadata, and thus to obtain a process which allows for multiple sequential signatures on a document and at least one associated document in a desynchronised fashion.

This type of process also serves to prevent previous signatures from being overwritten in cases where different software applications are used to sign the document(s) being processed, and thus to trace the addition of each individual signature to said document(s) sequentially in the audit trail.

In an initial form of embodiment, the source document D1 is certified by a notary, then sent to a first third party 100 for translation, and the translation thus generated is signed. The documents D2, DA are then sent to an additional third party 200 to be legalised, that third party 200 being a government authority. The documents thus generated are sent to a second additional, consulate-type third party 200. The documents previously generated are subjected to super legalisation-type processing.

In a second form of embodiment, the source document D1 is certified by a notary, then sent to a first third party 100 for translation, and the translation thus generated is signed. The documents D2, DA are then sent to an additional third party 200 for an apostille, the additional third party 200 being a government authority.

In practice, the saving sub-steps of the initialisation step S0 and the receiving step S2 are implemented temporarily pending storage of the required information in the blockchain system B, so that the documents D1, D2, DA are not permanently archived, thus guaranteeing the confidentiality of the documents D1, D2, DA.

For example, documents D1, D2, DA are PDF files.

The audit trail of the blockchain system B is thus populated over time by the processing operations of successive third parties (100, 200), and each initialisation step S0 and receiving step S2 allows for storage of successive data relating to each third party 100, 200, thus ensuring that any verifying third party can access an authentication tree from the source document D1.

With reference to FIGS. 6 and 7, the invention also relates to a platform for traceability of an attachment DA generated by a third party 100 from a source document D1, said platform interacting with a blockchain system B for implementation of the traceability process.

In accordance with the invention, the chosen structure of the traceability platform comprises:
- means of saving and analysing the source document D1 to obtain initialisation metadata comprising metadata MID1 intrinsic to the source document D1 and extrinsic metadata MED1 comprising digital fingerprints of the source document HD1, its content HB1, and metadata HM1 relating to the source document D1;
- means of receiving S2 from the third party 100 comprising means of saving and analysing the source document D2 and the attachment DA thus received signed from the third party 100 to obtain receiving data comprising intrinsic metadata of the source document and digital fingerprints of the source document received HD2, the attachment HDA and the reference document HRA and their respective content HBA, HB2, HBRA, as well as of metadata HM2 and HMA relating to the source document and the attachment;
- means of placing the initialisation metadata and the receiving metadata in a respective smart contract of the blockchain system B.

In practice, the platform in accordance with the invention comprises at least one web server which can be connected across a network to a user device, and which is capable of receiving and saving at least one document belonging to the group consisting of source document D1, signed source document D2, and generated attachment DA from the user or from a third party 100, 200.

In one form of embodiment of the invention, the platform in accordance with the invention also comprises at least one application server capable of analysing at least one document belonging to the group consisting of source document D1, signed source document D2, and generated attachment DA, and of calculating the digital fingerprints HD1, HB1, HM1, HD2, HB2, HM2, HDA, HMA necessary during the implementation of the traceability process in accordance with the invention.

The platform in accordance with the invention also comprises a storage module enabling storage via transactions executed in smart contracts B1, B2, B3, in a blockchain system B.

Said storage module comprises at least one node server capable of forming an integral part of the blockchain system B consisting of multiple interconnected nodes.

In one form of embodiment of the invention, the blockchain system B is a public blockchain system.

In an alternative form of embodiment of the invention, the blockchain system B is a private blockchain system.

In a particular form of embodiment of the invention, the platform in accordance with the invention also comprises a plurality of databases.

Each database includes at least one list of third parties A, B, C capable of performing at least one chosen processing operation 101, 201, as well as information concerning said third parties A, B, C, such as their contact details, identification numbers on the platform, and the like.

In a particular form of embodiment of the invention, the platform comprises an application module enabling a user to be guided through the processing procedure, by selecting the third parties to whom the source document D1 to be processed is to be submitted, according to predefined processing parameters set by the user.

The application module of the platform in accordance with the invention must be capable of saving the document processing parameters D1 desired by a user.

For example, if the processing parameters are translation and certification by a government entity, the third parties A, B, C to be selected for the processing should allow for translation and legalisation.

In practice, the application module of the platform in accordance with the invention is capable of identifying at least one process 101 belonging to the group consisting of translation of a document, legalisation, and generation of an apostille.

Based on the processing parameters defined, the application module is capable of selecting from the databases of third parties A, B, C, for each type of processing selected, at least one third party A, B, C able to perform said processing operation, and of assigning the next third party 200 once the current third party 100 has processed and saved the document D2, DA being processed.

In a particular form of embodiment of the invention, the platform in accordance with the invention also comprises an API-type module configured to allow the assignment of at least one external electronic signature tool for the third party 100, and to receive in the form of an IFrame an executable to be applied to the document to be signed electronically by the third party.

What is claimed is:

1. A process for traceability of an attachment generated by a third party from a source document with which it is associated, said process using a blockchain system and comprising the following steps:
    an initialization step consisting of:
        saving and analysis of the source document to obtain initialization metadata of the source document, which consist of:
            metadata intrinsic to the source document; and
            metadata extrinsic to the source document incorporating the metadata generated by the application implementing the process;

calculation of the digital fingerprints of the source document and its content, and the digital fingerprints of the intrinsic metadata of the source document;

placing in a smart contract of a blockchain system initialization metadata of the source document, including the intrinsic metadata, and the extrinsic metadata incorporating the digital fingerprints calculated;

a processing step performed by the third party consisting of generation of the attachment by the third party, both the source document received as well as said attachment thus generated by the third party for processing being electronically signed by said third party, the attachment incorporating in its extrinsic metadata the reference digital fingerprints (HRA) of the source document with which the attachment is associated, and the digital fingerprints of the content of the source document taken to be signed; and a receiving step from the third party consisting of saving and, in parallel, analysis of the signed source document and the signed attachment received from the third party to obtain reception metadata comprising:

intrinsic metadata of the signed source document and the intrinsic metadata of the signed attachment;

extrinsic metadata of the signed source document and the extrinsic metadata of the signed attachment containing the digital fingerprints:

of the source document received of the attachment and the reference document and their respective content;

the metadata relating to the signed source document and the signed attachment;

the receiving metadata being placed in the smart contract of the blockchain system;

a smart contract thus placed after each initialization step and each receiving step, thus enabling the creation of an audit and traceability trail for the attachment generated by the third party from the source document with which it is associated; and a sending step that consists of sending the source document to the third party, the metadata intrinsic to the source document and the extrinsic metadata comprising the digital fingerprints of the source document, its content, and metadata relating to the source document being placed in the smart contract of the blockchain system.

2. The traceability process in accordance with claim 1, wherein the metadata thus obtained at each initialization step, sending step and receiving step are stored in a database and subsequently associated in a Merkle tree, the root hash of which is placed in the blockchain system.

3. The traceability process in accordance claim 1, wherein the intrinsic metadata belong to the group consisting of type, name, size, save date, user identifier, electronic signature data, and the certificate(s) associated with the electronic signature data.

4. The traceability process in accordance with claim 1, wherein the digital fingerprints are calculated according to a chosen hash function.

5. The traceability process in accordance with claim 4, wherein the hash function is SHA 256.

6. The traceability process in accordance with claim 1, characterised in that wherein the attachment belongs to the group consisting of translated document, digital document containing a legalization, digital document including an apostille.

7. The process in accordance with claim 1, wherein said process is implemented by several successive third parties, the initialization step, processing step and receiving step being repeated by the following third party based on the signed source document and the attachment generated by the preceding third party, the audit trail of the blockchain system thus being populated over time by the processing operations performed by the successive third parties.

8. A platform for traceability of an attachment generated by a third party from a source document, said platform interacting with a blockchain system for implementation of the process in accordance with claim 1, the platform comprising:

a processor; and a memory storing a set of computer instructions, which, when executed by the processor, cause the processor to:

save and analyze the source document to obtain initialization metadata comprising metadata intrinsic to the source document and extrinsic metadata comprising digital fingerprints of the source document, its content, and metadata relating to the source document, receive signed from the third party the source documents and the attachment and to save and analyze the source document and the attachment received signed from the third party to obtain receiving data comprising intrinsic metadata of the source document and digital fingerprints of the source document received, the attachment and the reference document and their respective content as well as metadata relating to the source document and the attachment; and place the initialization metadata and the receiving metadata in a smart contract of the blockchain system, and in which several successive third parties are able to populate the audit trail of the blockchain system over time, by the next third party based on the signed source document and the attachment generated by the previous third party.

9. The traceability platform in accordance with claim 8, further comprising an application module capable of recording the document processing parameters desired by a user, of identifying at least one processing operation belonging to the group consisting of translation of a document, legalization, generation of an apostille, of selecting for each type of processing operation at least one third party and of assigning a next third party once a current third party has processed and saved the document being processed.

10. The traceability platform in accordance with claim 9, further comprising a plurality of databases, each comprising at least one list of third parties capable of performing at least one chosen processing operation as well as information relating to said third parties.

* * * * *